US009668258B2

(12) United States Patent
Kenney et al.

(10) Patent No.: US 9,668,258 B2
(45) Date of Patent: May 30, 2017

(54) MASTER STATION AND METHOD FOR HIGH-EFFICIENCY WI-FI (HEW) COMMUNICATION USING MULTI-DEVICE HEW PREAMBLE

(71) Applicant: Intel IP Corporation, Santa Clara, CA (US)

(72) Inventors: Thomas J. Kenney, Portland, OR (US); Shahrnaz Azizi, Cupertino, CA (US); Eldad Perahia, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/026,820

(22) PCT Filed: Feb. 27, 2014

(86) PCT No.: PCT/US2014/019035
§ 371 (c)(1),
(2) Date: Apr. 1, 2016

(87) PCT Pub. No.: WO2015/076861
PCT Pub. Date: May 28, 2015

(65) Prior Publication Data
US 2016/0301501 A1    Oct. 13, 2016

Related U.S. Application Data

(60) Provisional application No. 61/906,059, filed on Nov. 19, 2013.

(51) Int. Cl.
*H04W 72/04* (2009.01)
*H04W 4/00* (2009.01)
(Continued)

(52) U.S. Cl.
CPC ........ *H04W 72/044* (2013.01); *H04B 7/0413* (2013.01); *H04B 7/0452* (2013.01);
(Continued)

(58) Field of Classification Search
USPC .................. 375/267; 370/329, 338
See application file for complete search history.

(56) References Cited

U.S. PATENT DOCUMENTS 7,685,495 B2 *    3/2010    Bhushan ............. H03M 13/271
                                                714/755
2011/0110348 A1    5/2011    Lee et al.
(Continued)

FOREIGN PATENT DOCUMENTS

WO    WO-2015076861 A1    5/2015

OTHER PUBLICATIONS

"International Application Serial No. PCT/US2014/019035, International Search Report mailed Aug. 20, 2014", 3 pgs.
(Continued)

*Primary Examiner* — Eva Puente
(74) *Attorney, Agent, or Firm* — Schwegman Lundberg & Woessner, P.A.

(57) ABSTRACT

Embodiments of a master station and method for high-efficiency Wi-Fi (HEW) communication using a multi-device HEW preamble are generally described herein. In some embodiments, the master station may select a number of long-training fields (LTFs) to be included in the multi-device HEW preamble of an HEW frame. The HEW frame may comprise a plurality of links for transmission of a plurality of streams. The master station may transmit the selected number of LTFs sequentially as part of the HEW preamble and transmit a plurality of data fields to scheduled stations during an HEW control period. Each data field may correspond to one of the links and may comprise one or
(Continued)

more streams. The selection of the number of LTFs to be included in the HEW preamble may be based on a maximum number of streams to be transmitted on a single link.

20 Claims, 4 Drawing Sheets

(51) Int. Cl.
*H04L 5/00* (2006.01)
*H04L 27/26* (2006.01)
*H04B 7/0452* (2017.01)
*H04B 17/336* (2015.01)
*H04J 11/00* (2006.01)
*H04L 29/06* (2006.01)
*H04W 24/02* (2009.01)
*H04W 56/00* (2009.01)
*H04W 52/02* (2009.01)
*H04B 7/0413* (2017.01)
*H04W 74/04* (2009.01)
*H04W 84/12* (2009.01)

(52) U.S. Cl.
CPC ............ *H04B 17/336* (2015.01); *H04J 11/00* (2013.01); *H04L 5/005* (2013.01); *H04L 5/0007* (2013.01); *H04L 5/0048* (2013.01); *H04L 27/2601* (2013.01); *H04L 27/2602* (2013.01); *H04L 27/2613* (2013.01); *H04L 27/2695* (2013.01); *H04L 69/22* (2013.01); *H04W 4/008* (2013.01); *H04W 24/02* (2013.01); *H04W 52/0216* (2013.01); *H04W 52/0219* (2013.01); *H04W 56/002* (2013.01); *H04W 72/0413* (2013.01); *H04W 72/0453* (2013.01); *H04W 74/04* (2013.01); *H04J 2011/0096* (2013.01); *H04W 84/12* (2013.01)

(56) References Cited

U.S. PATENT DOCUMENTS

| | | | |
|---|---|---|---|
| 2012/0269124 A1 | 10/2012 | Porat | |
| 2015/0117428 A1* | 4/2015 | Lee | H04L 27/206 370/338 |
| 2016/0072654 A1* | 3/2016 | Choi | H04L 27/2602 370/329 |
| 2016/0128005 A1* | 5/2016 | Chen | H04L 27/2613 455/127.2 |
| 2016/0204968 A1* | 7/2016 | Zhang | H04L 27/2602 370/338 |
| 2016/0205686 A1* | 7/2016 | Kim | H04L 27/2656 370/329 |

OTHER PUBLICATIONS

"International Application Serial No. PCT/US2014/019035, Written Opinion mailed Aug. 20, 2014", 5 pgs.

Al-Ghazu, Nader, "A Study of the Next WLAN Standard IEEE 802.11ac Physical Layer", Master of Science Thesis Stockholm, (Jan. 2013).

Zhang, Wenxuan, et al., "A novel high throughput long training field sequence design for Next-generation WLAN", Wireless Telecommunications Symposium (WTS), (Apr. 2011).

* cited by examiner

MASTER STATION AND METHOD FOR HIGH-EFFICIENCY WI-FI (HEW) COMMUNICATION USING MULTI-DEVICE HEW PREAMBLE

PRIORITY CLAIM

This application is a U.S. National Stage Application under 35 U.S.C. 371 from International Application No. PCT/US2014/019035, filed Feb. 27, 2014, which claims the benefit of priority to U.S. Provisional Patent Application Ser. No. 61/906,059, filed Nov. 19, 2013, which is incorporated herein by reference in its entirety.

TECHNICAL FIELD

Embodiments pertain to wireless networks. Some embodiments relate to Wi-Fi networks and networks operating in accordance with one of the IEEE 802.11 standards. Some embodiments relate to high-efficiency wireless or high-efficiency Wi-Fi (HEW) communications.

BACKGROUND

Wireless communications has been evolving toward ever increasing data rates (e.g., from IEEE 802.11a/g to IEEE 802.11n to IEEE 802.11ac). In high-density deployment situations, overall system efficiency may become more important than higher data rates. For example, in high-density hotspot and cellular offloading scenarios, many devices competing for the wireless medium may have low to moderate data rate requirements. The frame structure used for conventional and legacy IEEE 802.11 communications including legacy very-high throughput (VHT) communications may be less suitable for such high-density deployment situations.

One issue with these conventional communication techniques is that a preamble is sent for every packet transmission irrespective of which devices are communicating and when they last communicated with each other. This overhead becomes more significant in high-density deployment situations particularly for devices that have low to moderate data rate requirements.

Thus, there are general needs for devices and methods that improve overall system efficiency in wireless networks, particularly for high-density deployment situations. There are also general needs for devices and methods suitable for HEW communications. There are also general needs for devices and methods suitable for HEW communications that can coexist with legacy devices.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
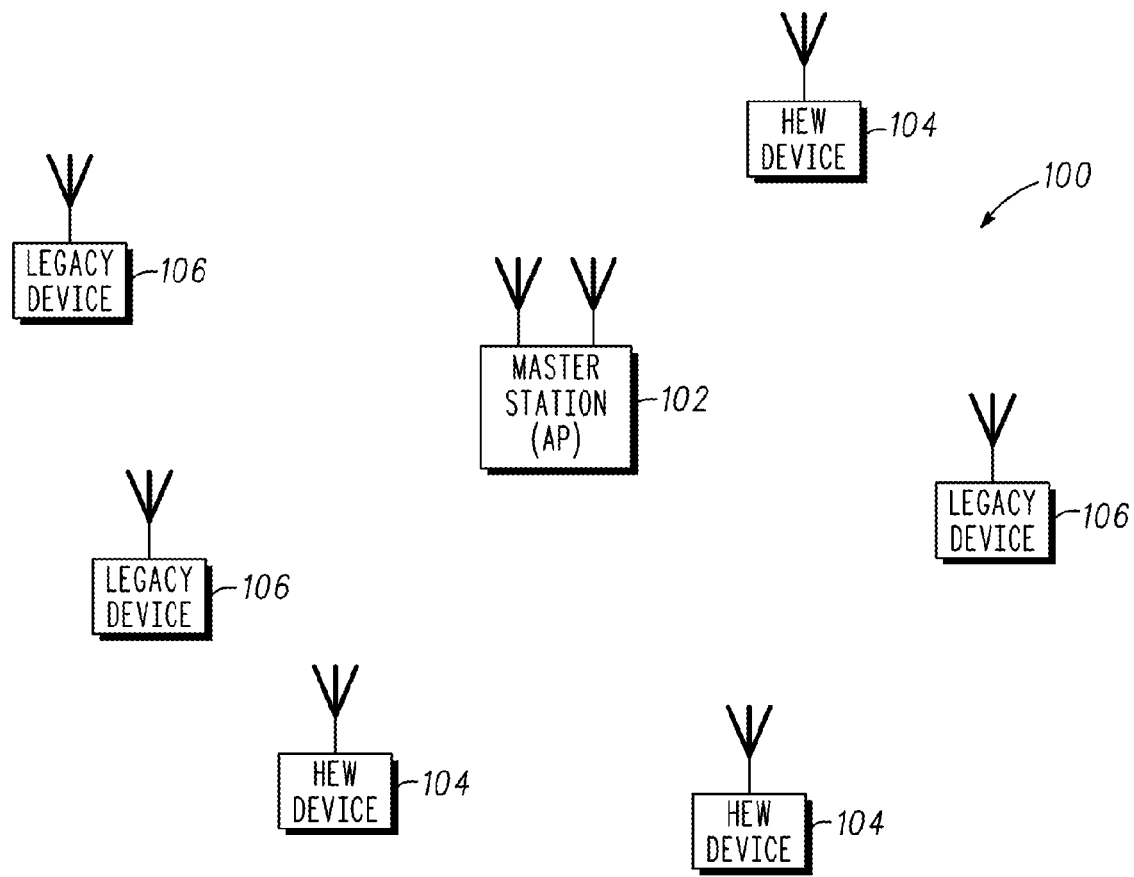
FIG. 1 illustrates a High Efficiency Wi-Fi (HEW) network in accordance with some embodiments.

FIG. 1 illustrates a High Efficiency Wi-Fi (HEW) network in accordance with some embodiments. HEW network 100 may include a master station (STA) 102, a plurality of HEW stations 104 (i.e., HEW devices), and a plurality of legacy stations 106 (legacy devices). The master station 102 may be arranged to communicate with the HEW stations 104 and the legacy stations 106 in accordance with one or more of the IEEE 802.11 standards. In some embodiments, the master station 102 may be an access point (AP), although the scope of the embodiments is not limited in this respect.

In accordance with embodiments, the master station 102 may include physical layer (PHY) and medium-access control layer (MAC) circuitry which may be arranged to contend for a wireless medium (e.g., during a contention period) to receive exclusive control of the medium for an HEW control period (i.e., a transmission opportunity (TXOP)). The master station 102 may transmit an HEW master-sync transmission at the beginning of the HEW control period. During the HEW control period, the HEW stations 104 may communicate with the master station 102 in accordance with a non-contention based multiple access technique. This is unlike conventional Wi-Fi communications in which devices communicate in accordance with a contention-based communication technique, rather than a multiple access technique. During the HEW control period, legacy stations 106 refrain from communicating. In some embodiments, the master-sync transmission may be referred to as an HEW control and schedule transmission.

In accordance with embodiments, the master station 102 may be arranged to select a number of long-training fields (LTFs) to be included in a multi-device HEW preamble of an HEW frame. The HEW frame may comprise a plurality of links for transmission of a plurality of streams. The master station 102 may also transmit the selected number of LTFs sequentially as part of the HEW preamble of the HEW frame and transmit a plurality of data fields sequentially to each of a plurality of scheduled HEW stations 104. The data fields may be part of the HEW frame. Each data field may correspond to one of the links and may comprise one or more streams.

In some embodiments, the selection of the number of LTFs to be included in the HEW preamble may be based on a maximum number of streams to be transmitted on a single link. In some embodiments, the selection of the number of LTFs to be included in the HEW preamble may be based on a scheduled HEW station 104 with a greatest channel estimation need (e.g., the scheduled HEW station 104 receiving the greatest number of streams on a single link).

In some embodiments, the number of LTFs to be included in the HEW preamble may be predetermined. In these embodiments, the number of LTFs to be included in the HEW preamble may be based on the maximum number of streams that can be transmitted on a single link.

In some embodiments, the master station 102 may be arranged to configure the HEW preamble include an HEW control signal field (HEW-CNTR-SIG) to identify and signal each of the data fields of the HEW frame. In these embodiments, a single HEW preamble is included in an HEW frame, which is unlike conventional techniques which include a preamble for each link.

In these embodiments, the HEW master-sync transmission that is transmitted at the beginning of the HEW control period may include the HEW preamble. The data fields of the HEW frame may be transmitted after the HEW preamble within the HEW control period.

Figure 2:
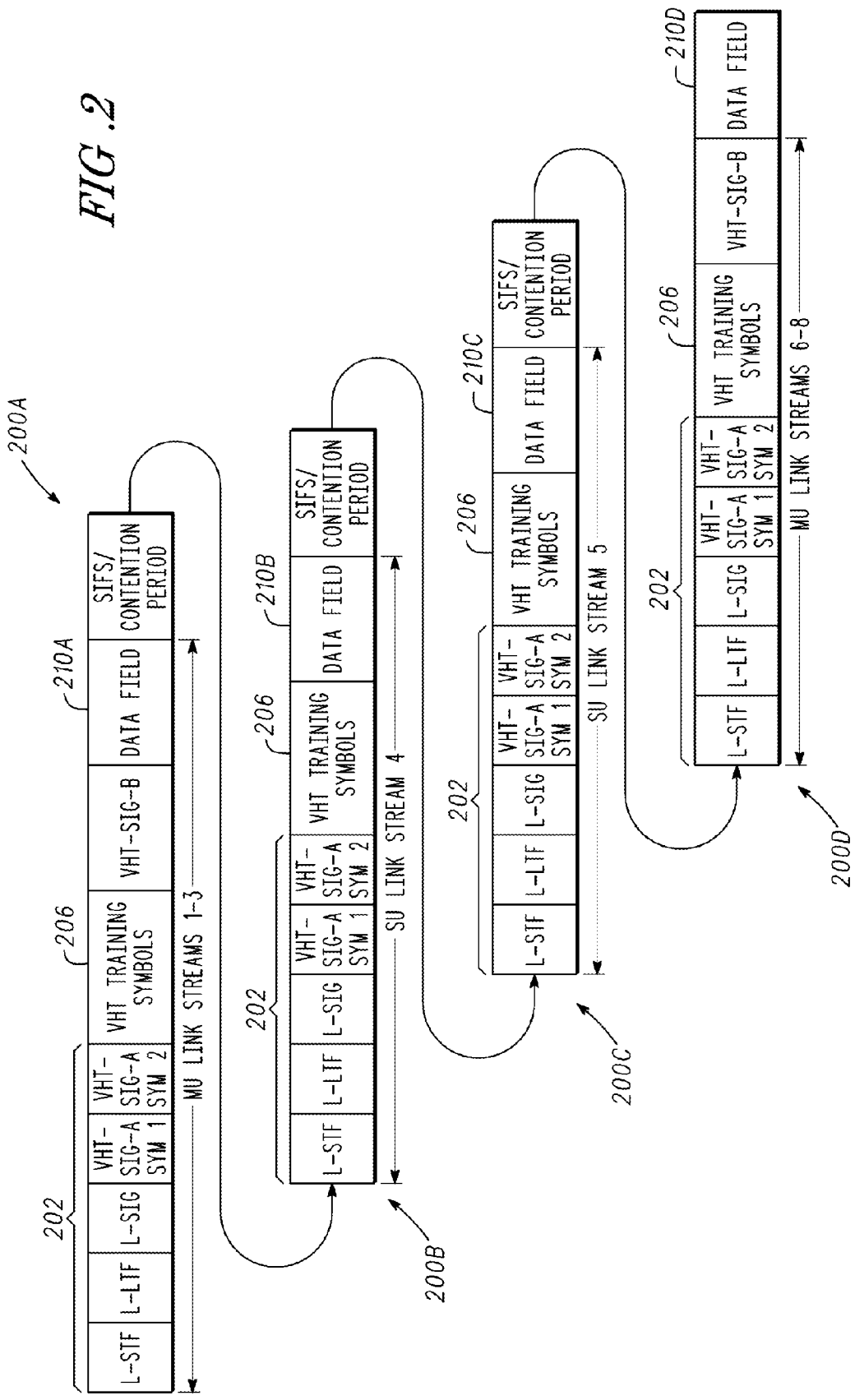
FIG. 2 illustrates a transmission comprising several links in accordance with some conventional techniques.

FIG. 2 illustrates a transmission comprising several links in accordance with some conventional techniques. Transmission 200 comprises packet transmission 200A for a first link, packet transmission 200B for a second link, packet transmission 200C for a third link, and packet transmission 200D for a fourth link. In the example illustrated, packet transmission 200A may be for a multi-user (MU) link and may include three streams (streams 1-3) that are included in data field 210A. Packet transmission 200B may be for a single-user (SU) link and may include a single stream (stream 4) that is included in data field 210B. Packet transmission 200C may be for a SU link and may include a single stream (stream 5) that is included in data field 210C. Packet transmission 200D may be for a MU-MIMO link and may include three streams (streams 6-8) that are included in data field 210D. Preamble 202 is transmitted for each packet transmission irrespective of which devices are communicating and irrespective when they last communicated with each other. The transmission of preamble 202 for each packet transmission reduces system efficiency. Furthermore, the VHT training symbols 206 are transmitted before each data field of each packet transmission, further reducing system efficiency.

In accordance with some embodiments, the master station 102 may use a control packet (e.g., a master-sync transmission) which has one training field for channel estimation, along with a single PHY signal field (SIG) to signal all scheduled HEW stations 104 at one time at the beginning of a scheduled exchange. This control transmission preamble may include a training field sufficient that all scheduled HEW stations 104 may be able to utilize it for channel estimation in a subsequent sequence of data fields. In addition, the single PHY SIG field may reduce the overhead instead of having a SIG field before each data field to each scheduled HEW station 104. These embodiments may eliminate repetitive training fields and may reduce signal field signaling overhead. Additionally, these embodiments may allow both single user (SU) and multi-user MIMO (MU-MIMO) links to be included as part of the HEW scheduled transmission. These embodiments may greatly reduce the overhead for these scheduled HEW exchanges.

In accordance with some of these embodiments, the HEW preamble may be configured to include sufficient training fields in the initial control packet for all scheduled HEW stations 104 that will be involved during a scheduled interval event to use for channel estimation. Additionally, the initial SIG field in the initial control packet may be configured to provide all the PHY signaling to the other scheduled HEW stations 104 in subsequent data packets or fields. During a scheduled interval, an HEW master device (e.g., master station 102) may communicate with multiple scheduled HEW stations 104. These transmissions can be SU or MU transmissions or a combination of both. In these embodiments, the master station 102 gains access to the medium and may use a schedule to allow HEW stations 104 to communicate. Since the master station 102 includes a sufficient number of LTFs in the initial transmission so all HEW scheduled stations 104 in the scheduled transmission can attain a channel estimate, there is no need for the master station 102 to provide a training field for each scheduled HEW station 104 independently.

There currently is no conventional mechanism to transmit to multiple devices sequentially (both SU and MU) in one scheduled period of time while providing one set of training fields along with a compact SIG field for all receivers. For high density deployment scenarios, removing or reducing fixed portions of a packet will improve overall efficiency.

Conventionally, an access point sends a transmission to each device with a preamble to each of the devices in order to allow a device (e.g., legacy station 106) to demodulate the signal. The preamble may be based on the device configuration (e.g., the number of antennas) and the transmit mode such as the number of streams, the space-time block code (STBC), whether the link is a SU or a MU-MIMO link, etc. In accordance with embodiments, the master station 102, during its initial transmission, will use enough LTFs to match the requirement of the scheduled HEW station 104 (or devices in the case of a MU-MIMO transmission) with the maximum need. For example, if there are four links in a HEW scheduled exchange, the first link may be using a MU-MIMO transmission (consisting of three users each with one stream for a total of three streams from the master), the second and third links may be SU links with one stream each, and the fourth link may be a MU-MIMO link with three streams (e.g., three users with one stream each). In this example, the maximum number of streams for a link is three streams requiring three LTFs in the HEW preamble. Since only one preamble is used for all four links instead of one preamble for each link, the efficiency improvement becomes substantial.

An additional benefit comes to the scheduled HEW stations 104 that have lower transmit modes and may require less LTFs than provided in the HEW preamble. For those devices, the extra LTFs may be used for improved channel estimates resulting in more robust operation for those links. All devices may be aware of how many LTFs are in this initial transmission from a first HEW-SIG, for example, which may carry this information. Additionally, another embodiment may use the N-STS (number of Space-Time-Streams) in the VHT-SIG to signal to all scheduled HEW stations 104 the number of LTFs. Thus, the initial transmission, which is to be received by all scheduled HEW stations 104 for that resource allocation time, will contain sufficient number of LTFs so a channel estimate can be made sufficient to demodulate all transit modes for all devices.

Additionally, to save the overhead of having independent signal fields for the transmission to each link, all this signaling may be done at the beginning of the scheduled transmission by the master station 102 in the master-sync transmission. The VHT SIG A may be used for the SU transmissions and the VHT SIG A and SIG B may be used for the MU-MIMO transmission, although this is not a requirement. In some embodiments, many bits may be eliminated where there is redundancy between the different link transmissions. For example, bits that are the same for all the scheduled HEW stations 104 in a scheduled transmission may be eliminated. In some embodiments, the master station 102 may group like devices with like parameter configurations to minimize signaling overhead. Thus these bits would not repeated in signaling to each scheduled HEW station 104 providing additional savings. At a minimum, only one use of the CRC and tail bits along with any reserved bits may be required. Some of these embodiments may save at least 16 bits for each link in the transmission to help provide a more compact HEW SIG and eliminate the need for separate signal fields prior to each link transmission.

Figure 3:
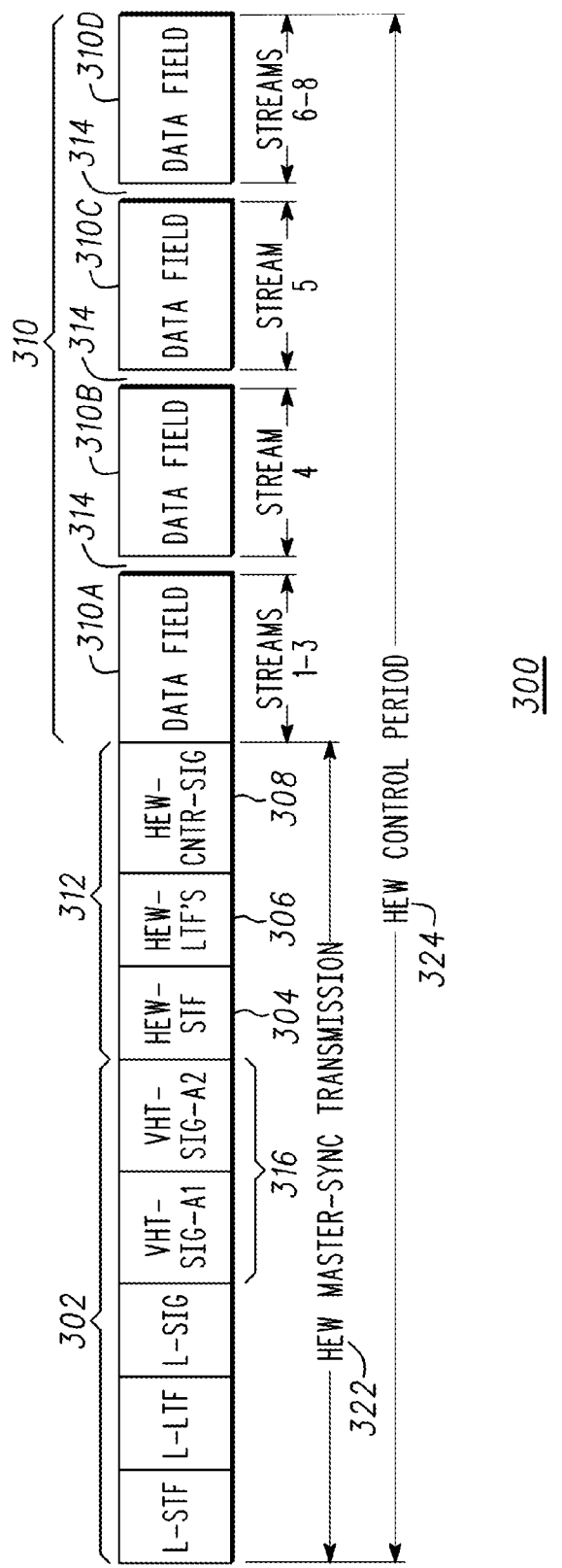
FIG. 3 illustrates an HEW transmission in accordance with some embodiments.

FIG. 3 illustrates an HEW transmission in accordance with some embodiments. HEW frame 300 may include a legacy preamble 302, an HEW preamble 312 and a plurality of data fields 310. Each data field 310 may correspond to a link and may include one or more streams.

In the example illustrated, data field 310A may be for a MU link and may include three streams (streams 1-3) for three users, data field 310B may be for a SU link and may include a single stream (stream 4) for a single user, data field 310C may also be for a SU link and may include a single stream (stream 5) for a single user, and data field 310D may be a MU link and may include three streams (streams 6-8) for three users. In this example, HEW frame 300 may carry the same number of links and streams as transmission 200 (FIG. 2), but with significantly less overhead. This is discussed in more detail below.

In accordance with embodiments, a number of long-training fields (LTFs) may be included in the HEW preamble 312. The number may be selected based on maximum number of streams to be transmitted on a single link that is included in the HEW frame 300. In these embodiments, the selection of the number of LTFs to be included in the HEW preamble 312 may based on a scheduled HEW station 104 with a greatest channel estimation need, which may be the station receiving the greatest number of streams on a single link.

In some embodiments, the master station 102 may configure the HEW preamble 312 to include the number of LTFs in an LTF portion 306 of the HEW preamble 312. The master station 102 may also configure the HEW preamble 312 to include an HEW control signal field (HEW-CNTR-SIG) 308 to follow the LTF portion 306.

In some embodiments, the master station 102 may also configure the HEW preamble 312 to include an HEW short training field (HEW-STF) 304 in the HEW preamble 312, although this is not a requirement. In some alternate embodiments, the master station 102 may configure the HEW preamble 312 without an HEW short training field. In some embodiments, the HEW-STF 304 is optional.

In some embodiments, each LTF included in the HEW preamble 312 may comprise a long-training sequence. The long-training sequence may be repeated a number of times, once for each LTF that is included in the LTF portion 306 of the HEW preamble 312.

The master station 102 may also configure the HEW frame 300 to include the legacy preamble 302 to precede the HEW preamble 312 for backwards compatibility. The legacy preamble 302 of the HEW frame 300 is arranged to be detected by legacy stations 106 to cause the legacy stations 106 to refrain from transmitting during the HEW control period 324.

In accordance with embodiments, a single HEW preamble (i.e., the HEW preamble 312) is included in the HEW frame 300 for all links, which is unlike conventional techniques which include a preamble for each link. For example, as illustrated in FIG. 2, each link utilizes a separate preamble (i.e., legacy preamble 202) and separate training symbols (i.e., VHT training symbols 206) for each link.

In some embodiments, the initial portion of the HEW frame 300 (e.g., preamble 302 and preamble 312) may be an HEW master-sync transmission 322, which may be considered an HEW control and schedule transmission or an HEW control packet that is transmitted at the beginning of the HEW control period 324.

In accordance with some embodiments, the HEW-CNTR-SIG 308 may be configured by the master station 102 for identifying and signaling each of the links of the HEW frame 300. In some embodiments, the HEW-CNTR-SIG 308 may be configured to indicate modulation parameters for each of the links (e.g., a modulation and/or coding scheme (MCS)), identify an encoding type (e.g., either convolutional or LDPC encoding) for each of the links, and/or identify whether each link associated with a particular data field 310 is a SU link or MU link. The HEW-CNTR-SIG 308 may also be configured to identify a number of spatial streams for each link. In some embodiments, the HEW-CNTR-SIG 308 may also include a cyclic-redundancy check (CRC) and tail bits (e.g., to flush out the decoder). In some embodiments, a MU link may be a MU-MIMO link, although this is not a requirement.

In accordance with embodiments, each data field 310 may be associated with either a SU link or a MU link and each link may be configurable to provide multiple spatial streams of data. Although the example HEW frame 300 is illustrated with four data fields corresponding to four links, the scope of the embodiments is not limited in this respect. In some embodiments, as few as one data field 310 may be provided. In other embodiments, up to ten or more data fields 310 may be provided depending on the length of the HEW control period 324.

In some embodiments, the master station 102 may provide a guard time 314 between the data fields 310 of the HEW frame 300, although the scope of the embodiments is not limited in this respect. In other embodiments, no guard time may be provided between the data fields 310 of the HEW frame 300.

In some alternate embodiments, instead of a plurality of data fields 310, the HEW frame 300 may include a single data field that may be configured as a multi-user data field. In these embodiments, the multi-user data field may be shared by multiple scheduled HEW stations 104. For example, the multi-user data field may be configured as a MU-MIMO transmission with several spatial streams, each utilizing the same frequency subcarriers. Alternatively, the multi-user data field may utilize different resources (e.g., either different block of OFDM subcarriers or resource blocks) allocated to different users. In these embodiments, the HEW-CNTR-SIG 308 may be arranged to provide signaling for a multi-user data field.

In some embodiments, the master station 102 may provide an indication of the number of LTFs that are included in the LTF portion 306 of the HEW preamble 312. In some embodiments, the indication of the number of LTFs that are included in the LTF portion 306 of the HEW preamble 312 may be provided in the legacy preamble 302 (e.g., in a legacy signal field such as the L-SIG). In some embodiments, the indication of the number of LTFs that are included in the LTF portion 306 of the HEW preamble 312 may be provided in a VHT signal field 316 (e.g., VHT-SIG A1, VHT-SIG A2) of the legacy preamble 302, although the scope of the embodiments is not limited in this respect.

In some alternate embodiments, the indication of the number of LTFs that are included in the LTF portion 306 of the HEW preamble 312 may be provided in a HEW signal field, such as the HEW-CNTR-SIG 308. In some of these alternate embodiments, the HEW-CNTR-SIG 308 may precede the LTF portion 306 in the HEW preamble 312.

In some embodiments, the legacy preamble 302 may include a legacy short-training field (L-STF), a legacy long-training field (L-LTF) and a legacy signal field (L-SIG). In some embodiments, the legacy preamble 302 may also include the legacy VHT signal field 316, although this is not a requirement as in some embodiments, the legacy preamble 302 would not include the legacy VHT signal field 316. In some embodiments, the legacy VHT signal field 316 is optional.

In accordance with embodiments, a VHT-SIG-B field is not needed HEW frame 300. A VHT-SIG-B is included in packet transmission 200A (FIG. 2) and packet transmission 200D (FIG. 2) to provide signaling for the corresponding MU links. In accordance with embodiments, the HEW-CNTR-SIG 308 may be configured to include information for identifying and signaling each of the links in HEW frame 300.

In accordance with embodiments, the LTFs that are included in HEW preamble 312 are to be used by the scheduled HEW stations 104 for channel estimation. In these embodiments, the scheduled HEW stations 104 that are receiving multiple streams may need to utilize at least as many LTFs as the number of streams for their channel estimate. Since the number of LTFs included in the HEW preamble 312 may be equal to the maximum number of streams to be transmitted on a single link, some scheduled HEW stations 104 will receive more LTFs than needed for their channel estimate allowing these devices to generate an improved channel estimate.

In some embodiments, the links of an HEW frame 300 may be configurable to have the same bandwidth and the bandwidth may be one of 20 MHz, 40 MHz, 80 MHz or 160 MHz. In some embodiments, a 320 MHz bandwidth may be used. In these embodiments, each link of an HEW frame 300 may be configured for transmitting a number of spatial streams and the number of LTFs included in the HEW preamble 312 may be equal to the maximum number of streams that is transmitted on a single link.

In some embodiments, the link bandwidth may be unrelated to the number of streams transmitted or whether the link is a SU or MU link. For example, a 20 MHz link may be either SU link or a MU link A 20 MHz SU link for example, may be used to transmit several spatial streams (e.g., up to four) to a single HEW station 104. A 20 MHz MU link for example, may be used to transmit several spatial streams (e.g., up to four) to several HEW stations 104.

In some embodiments, the master station 102 may initially contend for the wireless medium during a contention period to receive control of the medium for the HEW control period 324. The master station 102 may transmit the HEW frame 300 during the HEW control period. During the HEW control period 324, the master station 102 has exclusive use of the medium for communication with scheduled HEW stations 104 in accordance with a non-contention based multiple-access technique.

In some embodiments, the multiple-access technique used during the HEW control period 324 may be an orthogonal frequency division multiple access (OFDMA) technique, although this is not a requirement. In some embodiments, the multiple access technique may be a time-division multiple access (TDMA) technique or a frequency division multiple access (FDMA) technique.

The master station 102 may also communicate with legacy stations 106 (FIG. 1) in accordance with legacy IEEE 802.11 communication techniques. In some embodiments, the master station 102 may also be configurable communicate with HEW stations 104 outside the HEW control period 324 in accordance with legacy IEEE 802.11 communication techniques, although this is not a requirement.

The HEW packet structure for HEW frame 300 outlined above provides the benefit of increased PHY efficiency for HEW communication. The key aspects are that this HEW packet structure is that a separate preamble (i.e., legacy preamble 202) and separate training symbols (i.e., VHT training symbols 206) are not required for each link. This significantly increases PHY efficiency with no loss in performance. Additionally, as outlined above, devices with lower transmit modes (HEW stations 104 needing fewer LTFs then used in the HEW preamble 312) will benefit from improved channel and parameter estimation then would be the case in a conventional packet exchange. Additionally, selecting a single signal field (i.e., HEW-CNTR-SIG 308) ahead of time may allow for better assignment of the bits and opens up the ability of optimizing its use.

Figure 4:
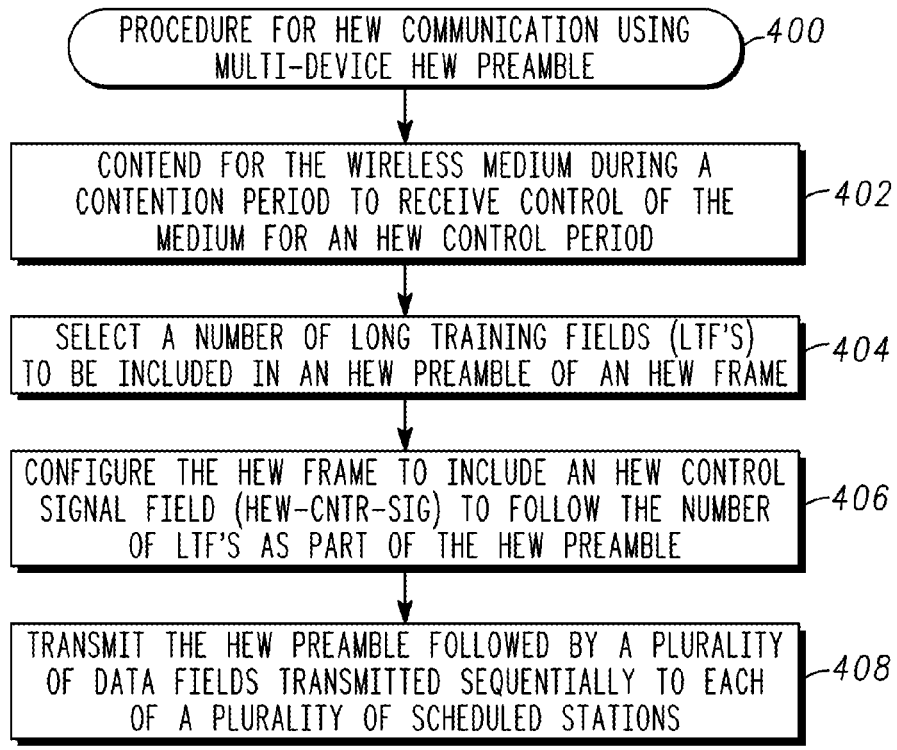
FIG. 4 is a procedure for HEW communications in accordance with some embodiments.

FIG. 4 is a procedure for HEW communications in accordance with some embodiments. Procedure 400 may be performed by a master station, such as master station 102 (FIG. 1), for communicating with a plurality of HEW devices, such as HEW stations 104 (FIG. 1), using a multi-device HEW preamble, such as HEW preamble 312 (FIG. 3), during an HEW control period 324 (FIG. 3).

Operation 402 comprises contending for the wireless medium during a contention period to receive control of the medium for an HEW control period 324. Prior to operation 402, the master station 102 may receive indications from stations that indicate which stations support HEW communication as well as other station capability information.

Operation 404 comprises selecting a number of LTFs to be included in the multi-device HEW preamble 312 of an HEW frame 300 (FIG. 3). The HEW frame 300 may comprise a plurality of links for transmission of a plurality of streams.

Operation 406 may comprise configuring the HEW frame 300 to include an HEW control signal field, such as HEW-CNTR-SIG 308 (FIG. 3), to follow the number of LTFs as part of the HEW preamble 312.

Operation 408 comprises transmitting the HEW frame 300 which includes the HEW preamble 312 followed by a sequential transmission of a plurality of data fields, such as data fields 310 (FIG. 3), to a plurality of scheduled HEW stations 104. The HEW frame 300 may be transmitted during the HEW control period 324 and the HEW preamble 312 may be an initial transmission, such as an HEW master-sync transmission 322 (FIG. 3) that is transmitted at the beginning of the HEW control period 324. The HEW master-sync transmission 322 may include at least a schedule indicating channel resources for communications with the HEW stations 104 during the HEW control period 324 in accordance with a non-contention based multiple access technique.

Figure 5:
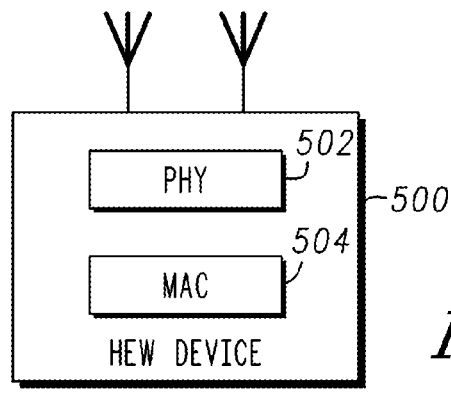
FIG. 5 is a functional block diagram of an HEW device in accordance with some embodiments.

FIG. 5 illustrates and HEW device in accordance with some embodiments. HEW device 500 may be an HEW compliant device that may be arranged to communicate with one or more other HEW devices, such as HEW stations 104, as well as communicate with legacy devices. HEW device 500 may be suitable for operating as master station 102 (FIG. 1) or an HEW station 104 (FIG. 1). In accordance with embodiments, HEW device 500 may include, among other things, physical layer (PHY) circuitry 502 and medium-access control layer circuitry (MAC) 504. PHY 502 and MAC 504 may be HEW compliant layers and may also be compliant with one or more legacy IEEE 802.11 standards. PHY 502 may be arranged to transmit HEW frames, such as HEW frame 300 (FIG. 3). HEW device 500 may also include other processing circuitry and memory to perform the various operations described herein.

In accordance with some embodiments, the MAC 504 may be arranged to contend for a wireless medium during a contention period to receive control of the medium for the HEW control period 324 (FIG. 3) and configure an HEW frame 300, and the PHY 502 may be arranged to transmit the HEW frame 300 as discussed above. MAC 504 may also be arranged to perform transmitting and receiving operations through the PHY 502. The PHY 502 may include circuitry for modulation/demodulation, upconversion/downconversion, filtering, amplification, etc. In some embodiments, the processing circuitry of the HEW device 500 may include one or more processors. In some embodiments, two or more antennas may be coupled to the physical layer circuitry arranged for sending and receiving signals including transmission of the HEW frame. The HEW device 500 may also include memory coupled with the processing circuitry for storing information for configuring the one or more processors to perform operations for configuring and transmitting HEW frames and performing the various operations described herein.

In some embodiments, the master station 102 may allocate resources to scheduled HEW stations 104 for use during the HEW control period based on criteria that includes one or more of signal-to-noise ratio (SNR), configuration, throughput, amount of data to send, a fairness criteria and quality-of-service requirements. The master station 102 may determine whether stations are HEW stations 104 or legacy stations 106 at the time of association with the master station 102 through a capability exchange. In some embodiments, the master station 102 may notify HEW stations 104 that the control period is to be used for communications in accordance with a multiple access technique. In some embodiments, the master station 102 may use the control period when there is congestion and communicate in accordance with conventional Wi-Fi techniques (e.g., CSMA/CA) otherwise. In some embodiments, mapping of a control signal may be performed at the beginning of the transmission to list devices that are to communicate during the control period, although the scope of the embodiments is not limited in this respect.

In some embodiments, the HEW device 500 may be configured to communicate using OFDM communication signals over a multicarrier communication channel. In some embodiments, HEW device 500 may be configured to receive signals in accordance with specific communication standards, such as the Institute of Electrical and Electronics Engineers (IEEE) standards including IEEE 802.11-2012 and/or 802.11n-2009 standards and/or proposed specifications for WLANs including proposed HEW standards, although the scope of the invention is not limited in this respect as they may also be suitable to transmit and/or receive communications in accordance with other techniques and standards. In some other embodiments, HEW device 500 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, HEW device 500 may be part of a portable wireless communication device, such as a personal digital assistant (PDA), a laptop or portable computer with wireless communication capability, a web tablet, a wireless telephone or smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, HEW device 500 may include one or more of a keyboard, a display, a non-volatile memory port, multiple antennas, a graphics processor, an application processor, speakers, and other mobile device elements. The display may be an LCD screen including a touch screen.

The antennas of HEW device 500 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result between each of antennas and the antennas of a transmitting station.

Although HEW device 500 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of HEW device 500 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In an example, a master station is arranged for communicating with a plurality of high-efficiency Wi-Fi (HEW) stations. The master station comprises processing circuitry configured to select a number of long-training fields (LTFs) to be included in a multi-device HEW preamble of an HEW frame; and physical layer (PHY) circuitry configured to: transmit, within an HEW control period, the selected number of LTFs sequentially as part of the HEW preamble; and transmit, within the HEW control period, a plurality of data fields sequentially to each of a plurality of scheduled HEW stations, the data fields being part of the HEW frame, each data field corresponding to one link and comprising one or more streams.

In another example, the selection of the number of LTFs to be included in the HEW preamble is based on a maximum number of streams to be transmitted on a single link.

In another example, the master station includes a medium-access control (MAC) layer circuitry arranged to configure the HEW preamble to include the number of LTFs in an LTF portion of the HEW preamble, include an HEW control signal field (HEW-CNTR-SIG) to follow the LTF portion, and configure the HEW frame to include a legacy preamble to precede the HEW preamble.

In another example, the HEW-CNTR-SIG is configured by the master station for signaling and identifying each of the links of the HEW frame.

In another example, the HEW-CNTR-SIG is configured to identify one or more of: modulation parameters for each of the links; an encoding type for each of the links; whether each link is a single user (SU) link or a multi-user (MU) link; and a number of streams for each link.

In another example, each data field is associated with either a single user (SU) link or a multi-user (MU) link, each link configurable to provide multiple streams of data.

In another example, the master station may further be arranged to provide an indication of the number of LTFs that are included in the LTF portion of the HEW preamble.

In another example, the indication of the number of LTFs that are included in the LTF portion of the HEW preamble is provided in the legacy preamble.

In another example, at least some of the LTFs that are included in the LTF portion of the HEW preamble are to be used by the scheduled HEW stations for channel estimation.

In another example, the links of the HEW frame are configurable to have a same bandwidth of one of 20 MHz, 40 MHz, 80 MHz or 160 MHz.

In another example, the master station may further be configured to: contend for a wireless medium during a contention period to receive control of the medium for the HEW control period; and transmit the HEW frame during the HEW control period, wherein during the HEW control period, the master station has exclusive use of the wireless medium for communication with the scheduled HEW stations in accordance with a non-contention based multiple-access technique.

In another example, a method performed by a master station for communicating with a plurality of high-efficiency Wi-Fi (HEW) stations may comprise selecting a number of long-training fields (LTFs) to be included in a multi-device HEW preamble of an HEW frame; transmitting, during an HEW control period, the selected number of LTFs sequentially as part of the HEW preamble; and transmitting, during the HEW control period, a plurality of data fields sequentially to each of a plurality of scheduled stations, the data fields being part of the HEW frame, each data field corresponding to one link and comprising one or more streams.

In another example, method may include configuring the HEW preamble to include the number of LTFs in an LTF portion of the HEW preamble; configuring the HEW preamble to include an HEW control signal field (HEW-CNTR-SIG) to follow the LTF portion; and configuring the HEW frame to include a legacy preamble to precede the HEW preamble.

In another example, the HEW-CNTR-SIG is configured by the master station for signaling and identifying each of the links of the HEW frame.

In another example, the selection of the number of LTFs to be included in the HEW preamble is based on a maximum number of streams to be transmitted on a single link.

In another example, each data field is associated with either a single user (SU) link or a multi-user (MU) link, each link configurable to provide multiple streams of data, and wherein the links of the HEW frame are configurable to have a same bandwidth of one of 20 MHz, 40 MHz, 80 MHz or 160 MHz In another example, the method may further include contending for a wireless medium during a contention period to receive control of the medium for the HEW control period; and transmitting the HEW frame during the HEW control period, wherein during the HEW control period, the master station has exclusive use of the wireless medium for communication with the scheduled HEW stations in accordance with a non-contention based multiple-access technique.

In another example, a non-transitory computer-readable storage medium that stores instructions for execution by one or more processors of a master station to perform operations for communicating with a plurality of high-efficiency Wi-Fi (HEW) stations is provided. The operations comprise selecting a number of long-training fields (LTFs) to be included in a multi-device HEW preamble of an HEW frame; transmitting, during an HEW control period, the selected number of LTFs sequentially as part of the HEW preamble; and transmitting, during the HEW control period, a plurality of data fields sequentially to each of a plurality of scheduled stations, the data fields being part of the HEW frame, each data field corresponding to one link and comprising one or more streams.

In another example, the operations further comprise: configuring the HEW preamble to include the number of LTFs in an LTF portion of the HEW preamble; configuring the HEW preamble to include an HEW control signal field (HEW-CNTR-SIG) to follow the LTF portion; and configuring the HEW frame to include a legacy preamble to precede the HEW preamble, wherein the HEW-CNTR-SIG is configured by the master station for signaling and identifying each of the links of the HEW frame.

In another example, the operations further comprise selecting the number of LTFs to be included in the HEW preamble based on a maximum number of streams to be transmitted on a single link.

In another example, a high-efficiency Wi-Fi (HEW) station comprises a receiver arranged to receive from a master station during an initial portion of an HEW control period, a master-sync transmission that includes a multi-device HEW preamble arranged to signal and identify a plurality of data fields for a plurality of scheduled HEW stations that are scheduled during the HEW control period; determine an initial channel estimate based on a number of long-training fields (LTFs) received within the HEW preamble; determine parameters for demodulation of an identified one of the data fields within the HEW control period, the parameters determined from an HEW control signal field (HEW-CNTR-SIG) of the HEW preamble; and demodulate data from the identified data field using the channel estimate, wherein within the HEW control period, the plurality of data fields are transmitted sequentially by the master station to each of the plurality of scheduled HEW stations, the data fields being part of the HEW frame, each data field corresponding to one link and comprising one or more streams.

In another example, the number of LTFs included in the HEW preamble is based on a maximum number of streams transmitted on a single link.

In another example, the receiver is further arranged to update the initial channel estimate based on pilots received within the data fields; and demodulate data from the identified data field using the updated channel estimate.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A master station arranged for communicating with a plurality of high-efficiency Wi-Fi (HEW) stations, the master station comprising:
processing circuitry configured to select a number of long-training fields (LTFs) to be included in a multi-device HEW preamble of an HEW frame; and
physical layer (PHY) circuitry configured to:
transmit, within an HEW control period, the selected number of LTFs sequentially as part of the HEW preamble; and
transmit, within the HEW control period, a plurality of data fields sequentially to each of a plurality of scheduled HEW stations, the data fields being part of the HEW frame, each data field corresponding to one link and comprising one or more streams.

2. The master station of claim 1 wherein the selection of the number of LTFs to be included in the HEW preamble is based on a maximum number of streams to be transmitted on a single link.

3. The master station of claim 1 wherein the master station includes a medium-access control (MAC) layer circuitry arranged to configure the HEW preamble to:
include the number of LTFs in an LTF portion of the HEW preamble;
include an HEW control signal field (HEW-CNTR-SIG) to follow the LTF portion; and
configure the HEW frame to include a legacy preamble to precede the HEW preamble.

4. The master station of claim 3 wherein the HEW-CNTR-SIG is configured by the master station for signaling and identifying each of the links of the HEW frame.

5. The master station of claim 4 wherein the HEW-CNTR-SIG is configured to identify one or more of:
modulation parameters for each of the links;
an encoding type for each of the links;
whether each link is a single user (SU) link or a multi-user (MU) link; and
a number of streams for each link.

6. The master station of claim 4 wherein each data field is associated with either a single user (SU) link or a multi-user (MU) link, each link configurable to provide multiple streams of data.

7. The master station of claim 4 further arranged to provide an indication of the number of LTFs that are included in the LTF portion of the HEW preamble.

8. The master station of claim 7 wherein the indication of the number of LTFs that are included in the LTF portion of the HEW preamble is provided in the legacy preamble.

9. The master station of claim 4 wherein at least some of the LTFs that are included in the LTF portion of the HEW preamble are to be used by the scheduled HEW stations for channel estimation.

10. The master station of claim 2 wherein the links of the HEW frame are configurable to have a same bandwidth of one of 20 MHz, 40 MHz, 80 MHz or 160 MHz.

11. The master station of claim 2 further configured to:
contend for a wireless medium during a contention period to receive control of the medium for the HEW control period; and
transmit the HEW frame during the HEW control period, wherein during the HEW control period, the master station has exclusive use of the wireless medium for communication with the scheduled HEW stations in accordance with a non-contention based multiple-access technique.

12. A method performed by a master station for communicating with a plurality of high-efficiency Wi-Fi (HEW) stations, the method comprising:
selecting a number of long-training fields (LTFs) to be included in a multi-device HEW preamble of an HEW frame;
transmitting, during an HEW control period, the selected number of LTFs sequentially as part of the HEW preamble; and
transmitting, during the HEW control period, a plurality of data fields sequentially to each of a plurality of scheduled stations, the data fields being part of the HEW frame, each data field corresponding to one link and comprising one or more streams.

13. The method of claim 12 further comprising:
configuring the HEW preamble to include the number of LTFs in an LIT portion of the HEW preamble;
configuring the HEW preamble to include an HEW control signal field (HEW-CNTR-SIG) to follow the LIT portion; and
configuring the HEW frame to include a legacy preamble to precede the HEW preamble.

14. The method of claim 13 wherein the HEW-CNTR-SIG is configured by the master station for signaling and identifying each of the links of the HEW frame.

15. The method of claim 14 wherein the selection of the number of LTFs to be included in the HEW preamble is based on a maximum number of streams to be transmitted on a single link.

16. The method of claim 15 wherein each data field is associated with either a single user (SU) link or a multi-user (MU) link, each link configurable to provide multiple streams of data, and
wherein the links of the HEW frame are configurable to have a same bandwidth of one of 20 MHz, 40 MHz, 80 MHz or 160 MHz.

17. The method of claim 16 further comprising:
contending for a wireless medium during a contention period to receive control of the medium for the HEW control period; and
transmitting the HEW frame during the HEW control period, wherein during the HEW control period, the master station has exclusive use of the wireless medium for communication with the scheduled HEW stations in accordance with a non-contention based multiple-access technique.

18. A non-transitory computer-readable storage medium that stores instructions for execution by one or more processors of a master station to perform operations for communicating with a plurality of high-efficiency Wi-Fi (HEW) stations, the operations comprising:
selecting a number of long-training fields (LTFs) to be included in a multi-device HEW preamble of an HEW frame;
transmitting, during an HEW control period, the selected number of LTFs sequentially as part of the HEW preamble; and
transmitting, during the HEW control period, a plurality of data fields sequentially to each of a plurality of scheduled stations, the data fields being part of the HEW frame, each data field corresponding to one link and comprising one or more streams.

19. The non-transitory computer-readable storage medium of claim 18 wherein the operations further comprise:
configuring the HEW preamble to include the number of LTFs in an LTF portion of the HEW preamble;

configuring the HEW preamble to include an HEW control signal field (HEW-CNTR-SIG) to follow the LTF portion; and configuring the HEW frame to include a legacy preamble to precede the HEW preamble, wherein the HEW-CNTR-SIG is configured by the master station for signaling and identifying each of the links of the HEW frame.

20. The non-transitory computer-readable storage medium of claim 18 wherein the operations further comprise selecting the number of LTFs to be included in the HEW preamble based on a maximum number of streams to be transmitted on a single link.

* * * * *

UNITED STATES PATENT AND TRADEMARK OFFICE
CERTIFICATE OF CORRECTION

PATENT NO. : 9,668,258 B2
APPLICATION NO. : 15/026820
DATED : May 30, 2017
INVENTOR(S) : Kenney et al.

Page 1 of 1

It is certified that error appears in the above-identified patent and that said Letters Patent is hereby corrected as shown below:

In the Claims

In Column 14, Line 17, in Claim 13, delete "LIT" and insert --LTF-- therefor

In Column 14, Line 19, in Claim 13, delete "LIT" and insert --LTF-- therefor

Signed and Sealed this
Twenty-eighth Day of May, 2019

Andrei Iancu
*Director of the United States Patent and Trademark Office*